United States Patent [19]

Low

[11] Patent Number: 5,910,984
[45] Date of Patent: Jun. 8, 1999

[54] FAULT TOLERANT SERVICE-PROVIDING APPARATUS FOR USE IN A TELECOMMUNICATIONS NETWORK

[76] Inventor: Colin Low, 19 Parklands, Wooton-under-Edge, Gloucestershire GL12 7LT, United Kingdom

[21] Appl. No.: 08/553,632

[22] PCT Filed: Jun. 10, 1994

[86] PCT No.: PCT/GB94/01257

§ 371 Date: Dec. 6, 1995

§ 102(e) Date: Dec. 6, 1995

[87] PCT Pub. No.: WO94/30027

PCT Pub. Date: Dec. 22, 1994

[30] Foreign Application Priority Data

Jun. 14, 1993 [GB] United Kingdom .................. 9312246

[51] Int. Cl.$^6$ .............................. H04M 3/42; H04M 3/00
[52] U.S. Cl. .......................... 379/279; 379/207; 379/220; 379/244; 379/284
[58] Field of Search ................................. 379/67, 88, 89, 379/207, 26, 27, 279, 201, 220, 244, 284

[56] References Cited

U.S. PATENT DOCUMENTS

| | | | |
|---|---|---|---|
| 4,894,828 | 1/1990 | Novey et al. | 371/11.3 |
| 4,926,422 | 5/1990 | Alaria et al. | 370/97 |
| 5,115,425 | 5/1992 | Ardon | 370/54 |
| 5,491,742 | 2/1996 | Harper et al. | 379/201 |
| 5,515,429 | 5/1996 | Kawada et al. | 379/279 |

FOREIGN PATENT DOCUMENTS 0451400  10/1991  European Pat. Off. .

OTHER PUBLICATIONS

Bellcore Special Report; SR–NPL–001623; Jun. 1990.
Bellcore Technical Advisory; TA–NWT–001123; May 1991.
Bellcore Technical Advisory; TA–NWT–001126; May 1991.
IEEE International Conference On Communications, vol. 2, May 14, 1984, Amsterdam NL pp. 734–737.
D. Cohen et al. 'Database management Strategies to Support Network Services' see p. 735, left column, paragraph 5 6; figure 1 see p. 735, right column, last paragraph see p. 736. left column, paragraph 3.
International Switching Symposium 1990, Session B8, paper #7 vol. 5, May 28, 1990, Stockholm SE pp. 171–176.
F. Dolenc 'Switch Architecture for Intelligent Networks' see p. 176, left column, last paragraph; figure 9.
Bell System Technical Journ al vol. 62, No. 6, 1983, New York US, pp. 1497–1536 D.W. Brown et al. 'Hosting the No. 10A Remote Switching System' see p. 1513, last paragraph–p. 1514, paragraph 1.
Telcom Report vol. 14, No. 2, Mar. 1991, Munchen DE, pp. 92–95, XP000204310 E. Genzone et al. 'Kommunikationskomfort auch auf dem Land' see p. 94, right column, last paragraph; figure 3.

*Primary Examiner*—Fan S. Tsang
*Assistant Examiner*—Allan Hoosain

[57] ABSTRACT

A telecommunications network architecture is known comprising a switching system for effecting basic call processing to set up, maintain and clear calls, and service-providing means (SPA) communicating with said switching system for providing services additional to said basic call processing. Due to the high availability requirements typically placed on telecommunications networks, the service providing means will generally need to be of a fault-tolerant design. A fault tolerant architecture is provided that relies on the checkpointing to a reliable store of state data for services currently being provided from first service logic of the service-providing means; should the first service logic fail, a second service logic is brought into operation and provided with required state data on current services from the backup store. To reduce the amount of checkpointing of data by the first logic, state data is only checkpointed when the corresponding call has reached a stable phase, the loss of a call during setup being much more acceptable than after it is been established.

26 Claims, 8 Drawing Sheets

FAULT TOLERANT SERVICE-PROVIDING APPARATUS FOR USE IN A TELECOMMUNICATIONS NETWORK

FIELD OF THE INVENTION

The present invention relates to telecommunications networks and, more particularly, to fault tolerant service-providing apparatus for providing call processing services to a switching centre of a telecommunications network.

BACKGROUND OF THE INVENTION

A telecommunications network architecture is known comprising a switching system for effecting basic call processing to set up, maintain and clear calls, and service-providing means communicating with said switching system for providing services additional to said basic call processing; examples of such additional services are:

| | |
|---|---|
| 3-way calling | private virtual networks |
| call screening | call blocking |
| call forwarding | wake-up calls |
| call waiting | Freephone/Teleinfo |
| televoting | calling name delivery |
| 800 number lookup | speed dialing |
| Yellow pages plus | universal personal telephone |
| Account card/credit card calling | number translation |
| network automatic call distribution | |

The switching system of such an arrangement generally treats a call as comprising two or more call portions (also known as "segments") and is operative to set-up, maintain and clear the or each such call portion. Thus where the switching system comprises more than one switching centre or point, a call will typically be treated as having an originating and terminating call portion in each switching centre; of course, even with such an arrangement, the call can be considered at a higher level as consisting of only one portion. To interface the basic call-processing functionality of the switching system with the service-providing means, the switching system is provided with interface means. These interface means enable the switching system to request service provision from the service-providing means in respect of a particular call portion, and to report to the service-providing means on progress through the process of set-up, maintenance and clearance of that call portion, and also enable said service-providing means to influence that process according to the service being provided by the service-providing means.

One such prior art telecommunications network architecture known as AIN (Advanced Intelligent Network) has been proposed by Bellcore and is described in detail in the following and other documents:

Advanced Intelligent Network Release 1 Network & Operations Plan, Bellcore Special Report SR-NPL-001623, Issue 1, June 1990, Advanced Intelligent Network Release 1 Switch—Service Control Point (SCP) Application Protocol Interface General Requirements, Bellcore Technical Advisory. TA-NWT-001126 Issue 1, May 1991.

The description of an embodiment of present invention contained in this specification is set in the context of an AIN network and accordingly reference is directed to the above documents for details of the implementation of the overall network architecture in relation to the described embodiment of the invention. However, to facilitate an understanding of the present invention without needing to refer to the above documents, certain important aspects of an AIN network are described herein with reference to FIGS. 1 to 9, these Figures being based on those appearing in the Bellcore documents. It is to be understood that the present invention is capable of application in environments other than an AIN network, as long as the telecommunications network functions in the usual way as defined on page 1–5 of the above-identified Bellcore Technical Advisory TA-NWT-001126. That is, the telecommunications network must provide the capability to 'user' entities external to the network to exchange information with other users and with the network.

For the purposes of the present introduction, a brief overview of the general AIN architecture will now be given with reference to FIG. 1 of the accompanying drawings.

Figure 1:
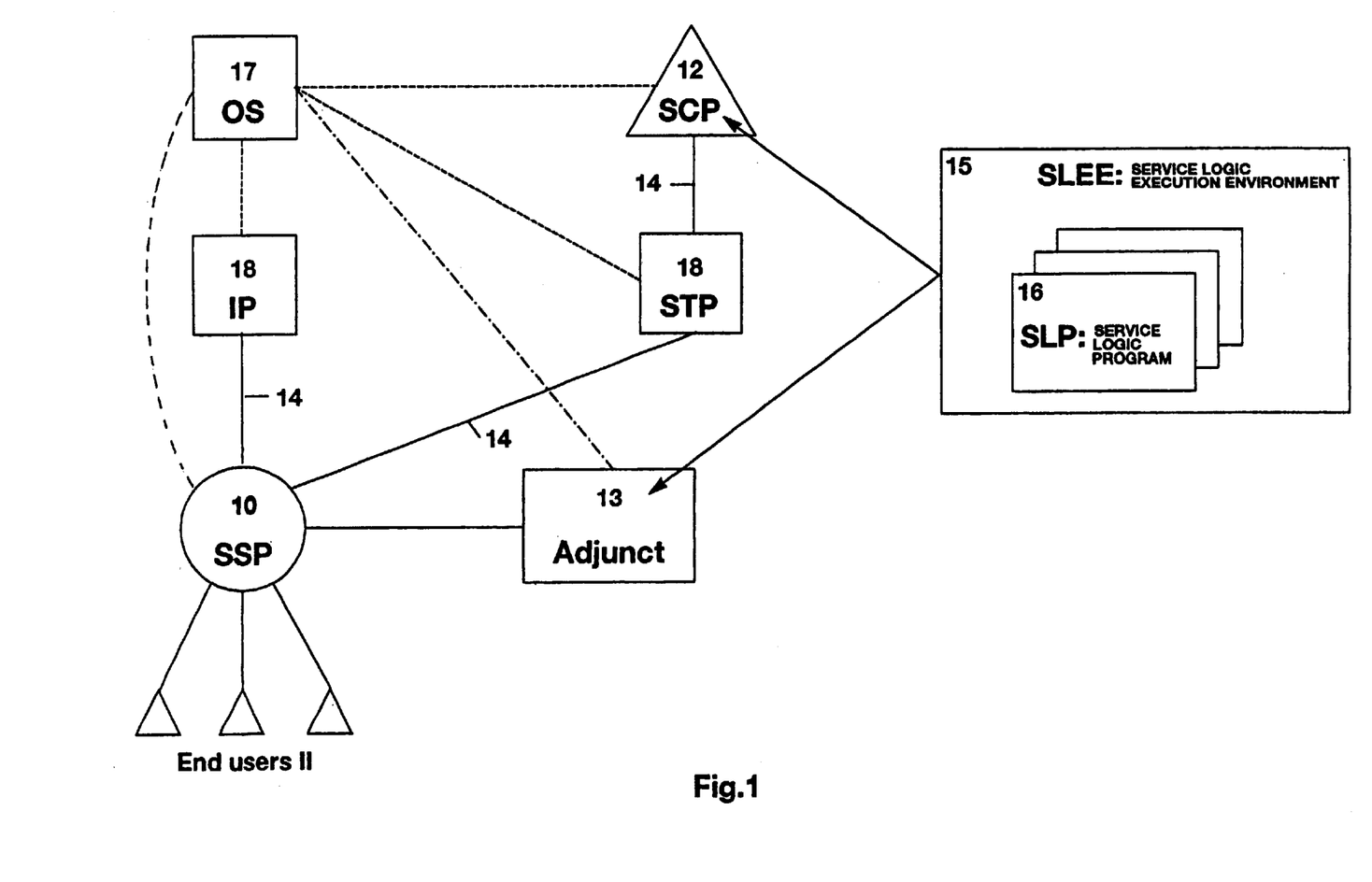
FIG. 1 is a diagram illustrating a known general architecture for a telecommunications network intended to provide services additional to basic call set up and clearance, the FIG. 1 network including, in particular, a service switching point (SSP) and two dispositions of service-providing apparatus (SPA), namely a service control point (SCP) and an Adjunct processor.

In the FIG. 1 network, basic call processing (that is, call setup, maintenance and clearance) is carried out by one (or more) service switching points SSP 10 to which End Users 11 are connected. Additional services, such as those listed above, are provided, on request, to the SSP 10 either by a service control point (SCP) 12 or an Adjunct 13, both of which are examples of service-providing apparatus (SPA). The Adjunct 13 is directly associated with the SSP 10 whilst the SCP 12 and SSP 10 communicate with each other via a common channel signalling (CCS) network 14 that will typically include signal transfer points (STP) 18. The SCP 12 may be associated with more than one SSP 10. Each SPA (whether the SCP 12 or Adjunct 13) provides a service logic execution environment (SLEE) 15 in which instances of one or more service logic programs (SLP) 16 can execute. The SLEE 15 and SLP 16 together provide service logic functionality for providing services to the SSP 10.

In operation, when the SSP 10 receives a call, it examines internal trigger conditions and, possibly, user information (eg dialled digits) to ascertain if the call requires a service to be provided by an SPA 12, 13; the checking of trigger conditions is carried out at several different points in call processing. Where the SSP 10 determines that a service is required it messages an SPA requesting the desired service and sending it a logic representation of the call in terms of its connectivity and call processing status. The SPA then provides the requested service and this may involve either a single interaction between the SSP and SPA or a session of interactions.

In addition to the SSP 10 and Adjunct 13, the FIG. 1 Network includes an intelligent peripheral (IP) 16 and an operations system (OS) 17. The IP 16 provides resources to the SSP 10 such as voice announcements and DTMF digit collection capabilities. The OS 17 has a general view of the network and its services and performs functions such as network monitoring and control.

Where the network comprises more than one SSP 10 through which a call can be routed, each SSP is preferably provided with the same support resources as the SSP 10 of FIG. 1.

From the foregoing brief overview of an AIN network it will be appreciated that an SPA 12, 13 is an integral part of the network and is therefore subject to similar constraints regarding availability and reliability as the SSP 10 itself. To satisfy these requirements, a fault tolerant architecture is needed for an SPA 12, 13.

One possible solution is to provide low-level (i.e. hardware) fault tolerance where component or subsystem failure is detected and handled; however, such a solution is generally expensive and is slow to benefit from improvements in processor technology.

More attractive therefore, are solutions involving replication of processing capability using general purpose processors. One possible solution of this type would be to use active replication in which multiple processors each run the same processes, receive the same data, and carry out the same processing, a majority voting scheme then being used to determine the processing outcome. Such a solution would, however, be expensive and is only possible if system behaviour is deterministic. Another possible solution using replication of processing capability, is passive replication in which a main processing resource normally carries out processing and then updates a backup processing resource as to the results of processing; in this way, the backup processing resource is continually updated regarding state data and is therefore ready to take over from the main resource should the latter fail. However, an SPA might typically handle a thousand service requests per second. If the SPA has to retain call information for 3 minutes (for example), then at any time it would have information stored (including billing information) for 180,000 calls. It is not practical to transfer out from the main processing means the state data relating to each call whenever the data changes because the number of service requests is too great (it should be noted that when state data changes then either all the state data on the corresponding call must be transferred, or else extra processing must be carried out to identify and log the changes before transferring out only the changes—in either case the resource loading is substantially greater than will generally be needed to transfer back to the SPA the result of the processing that produced the state data changes).

Another possible fault-tolerant architecture would be to provide main and backup processing means as with passive replication but to backup state data from the main processing means to a stable store; should the main processing means fail, the backup processing means is brought into operation and passed the state data held in the backup store. Such an architecture, however, suffers from the same disadvantage noted above in relation to passive replication.

It is an object of the present invention to provide improved fault-tolerant service-providing means.

SUMMARY OF THE INVENTION

According to one aspect of the present invention, there is provided service providing apparatus for providing call processing services to a switching centre of a telecommunications network in respect of call segments being set up, maintained and cleared thereby, characterised in that the service-providing apparatus comprises:

first service logic means for normally providing said services to the switching centre, second service logic means for providing said services to the switching centre in the event of failure of said first service logic means, recovery means responsive to failure of said first service logic means to bring into operation said second service logic means, and a backup store, said first service logic means being operative to save to said backup store, state data held by the first service logic means on service provision to the or each call segment for which it is currently providing services, this saving of state data being effected in respect of a said call segment only after the first service logic means has determined that it has substantially completed at least the majority of its service-provision actions required during the set up of the corresponding call segment, and said second service logic means on being brought into operation, retrieving from said backup store, state data needed to continue to provide services on current call segments.

By this arrangement the resource loading of the main processing resource of the SPA (that is, the above-called "first service logic means") that is required to backup state data is substantially reduced because most of the interaction between an SSP and SPA takes place during call setup, a period of time which lasts less than 1 second. If call information is lost during call setup it is of minimal importance, as little revenue is lost and the end user will retry if the call fails. The per-call information that the SPA accumulates during call setup only becomes valuable if the call portion concerned becomes stable (i.e. established) at which point the number of interactions between the SSP and SPA is typically low, and the data becomes increasingly valuable as the call duration proceeds.

According to the present invention, the first service logic means of the SPA recognises automatically the point at which at least the majority of the service-provision actions required during set up of a call segment have been completed, and saves call data to a backup store where it will survive a failure. In the event of a failure, the majority of calls in the process of being set up will be lost, but service provision can be resumed for any calls (including all stable calls) which have had service-provision state data stored in backup storage by starting the second service logic means and providing it with the state data held in backup storage.

In one embodiment, the first service logic means determines that it has substantially completed at least the majority of its service-provision actions required during the set up of the corresponding call segment, when notified by the switching centre that at least the majority of the call-segment set-up process has been completed. Alternatively, the first service logic means may determine that it has substantially completed at least the majority of its service-provision actions required during the set up of the corresponding call segments, by simply noting where it is in the process of service provision. Another approach similar to the latter one, is for the first service logic means to determine that it has substantially completed at least the majority of its service-provision actions required during the set up of the corresponding call segment, when it determines that the next service-provision action may not be required until the corresponding call segment has entered its stable phase.

In order to keep the state data held in the backup store up-to-date, following the first saving of state data to the store by the first service logic means in respect of a particular call segment, any changes in this state data in the first service logic means gives rise to an updating of the state data held in the backup store.

Preferably, the said backup store is a fault-tolerant database or a disk drive.

Advantageously, not all the backed up data is passed to the second service logic means on the latter being brought into operation; to do so would not only introduce a significant delay before the second logic means was available but is also unnecessary as some of the data may not be required again. Instead, state data concerning a particular call segment is preferably only passed to said second service logic means when the latter requires such information as a result of a communication from said switching centre.

Where sessions of one or more calls can be established with session information on such sessions being held in the SPA, this session information is preferably also backed up to said backup store. This backed-up session information is advantageously only passed from the backup store to the second service logic means, on bringing into operation of the latter, in cases where state data for a current call segment relevant to the corresponding session is also passed to the second service logic means.

According to another aspect of the present invention, there is provided service providing apparatus for providing call processing services to a switching centre of a telecommunications network in respect of call segments being set up, maintained and cleared thereby, characterised in that the service-providing apparatus comprises:

first service logic means for normally providing said services to the switching centre, second service logic means for providing said services to the switching centre in the event of failure of said first service logic means, recovery means responsive to failure of said first service logic means to bring into operation said second service logic means, and a backup store, said first service logic means being operative to save to said backup store, state data held by the first service logic means on service provision to the or each call segment for which it is currently providing services, this saving of state data being effected in respect of a said call segment only after at least the majority of the set-up process for the segment has been completed, and said second service logic means on being brought into operation, retrieving from said backup store, state data needed to continue to provide services on current call segments. In this case, it is the completing of at least the majority of the call-segment set-up process itself (rather than of the service-provision actions) that is used to determine when to save state data.

According to a further aspect of the present invention, there is provided a telecommunications network comprising a switching system for effecting basic call processing to set up, maintain and clear calls, and service providing means communicating with said switching system for providing services additional to said basic call processing; said switching system treating a said call as comprising at least one call portion and said system being operative to set-up, maintain and clear the or each such call portion, the switching system including interface means for interfacing the system with the service providing means whereby to enable the switching system to request service provision therefrom in respect of a particular call portion, to report to the service providing means on progress through the process of set-up, maintenance and clearance of that call portion, and to enable said service providing means to influence that process according to the service being provided by the service providing means, characterised in that:

said interface means is operative to report to the service providing means when set-up of the corresponding call portion is at least substantially complete; and said service providing means comprises first service logic means for normally providing said services to the switching system, second service logic means for providing said services to the switching system in the event of failure of said first service logic means, recovery means responsive to failure of said first service logic means to bring into operation said second service logic means, and a backup store; said first service logic means being operative to save, to said backup store, call-portion related data held by the first service logic means on the or each call portion for which it is currently providing services, this backup being effected in respect of a said call portion only after said interface means of the switching system has reported that set-up of that call portion has been at least substantially completed, and said second service logic means, on being brought into operation, being provided from said backup store with the said call-portion related data needed to continue to provide requested services on current call portions.

BRIEF DESCRIPTION OF THE DRAWINGS

Service-providing apparatus (SPA) embodying the present invention will now be described, by way of non-limiting example, with reference to the accompanying diagrammatic drawings, in which.

DESCRIPTION OF THE PREFERRED EMBODIMENT

The service-providing apparatus embodying the invention is described hereinafter in relation to the FIG. 1 prior art network outlined above. In order to understand fully at what stages during call processing, the service-providing apparatus will effect back up of call state information, it is necessary to understand the call model that has been described in the above-mentioned Bellcore documents to define the elements relevant to interaction between an SSP 10 and an SPA 12, 13. The main features of this call model are therefore described below.

The call model is a conceptual model that builds on the existing digital switch functionality to be found in many modern digital switches. In particular, the call model defines what additional processing functionality needs to be present in an SSP, over and above standard basic call processing, in order to provide an interface for the latter with a SPA. As will be more fully explained hereinafter, this additional functionality is divided into two processing blocks, namely BCM processing concerned with basic call processing for setting up and clearing call portions, and connection view (CV) processing for providing an overview of each call portion for which services are required and for interacting with the SPA. It should be appreciated that the call model with its BCM and CV processing functionality blocks, is a vehicle for modelling interactions between an SSP and SPA; actual implementations of SSPs will generally not directly map onto the model but will nevertheless encompass the general functionality of the latter.

Connectivity Representation

The call model is based on a view of a call as made up of an originating call portion and terminating call portion within each SSP 10 through which the call passes; these call portions, known as call segments CS, are handled in a functionally separate manner in line with practice in current digital switches. Thus each CS may independently be provided with a respective service from an SPA 12, 13 and different CSs associated with the same call may be serviced by different SPAs.

Figure 2:
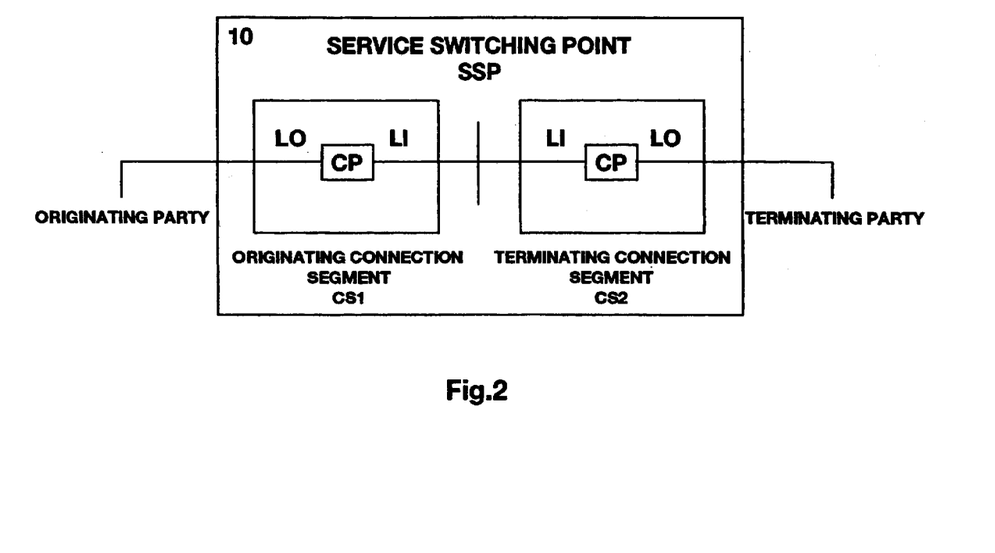
FIG. 2 is a diagram illustrating a connectivity model for a two-party call handled by a single SSP, the model comprising originating and terminating call segments.
Figure 3:
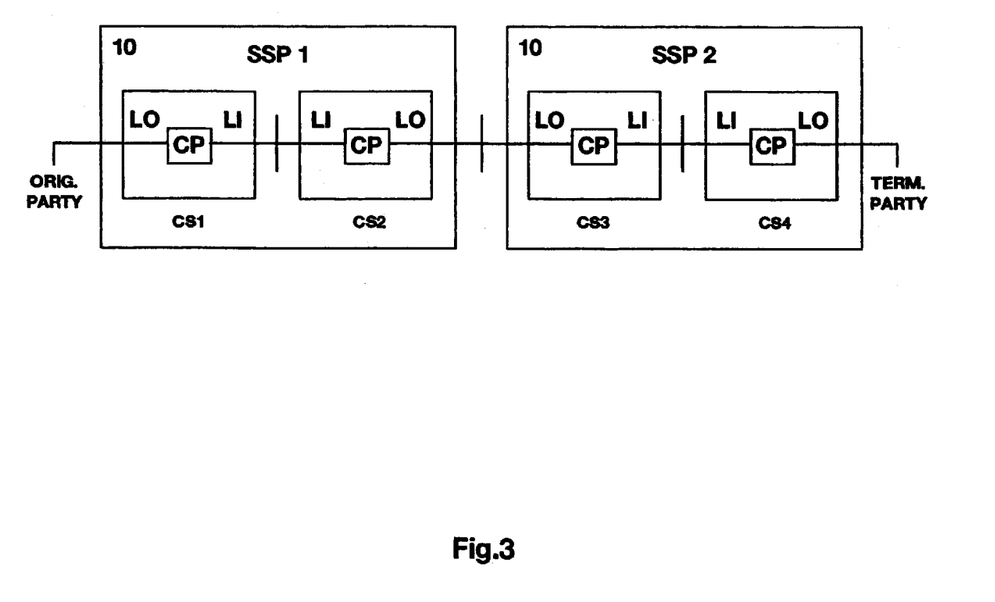
FIG. 3 is a diagram illustrating a connectivity model for a two-party call passing through two SSPs, the model comprising respective originating and terminating call segments for each SSP.
Figure 4:
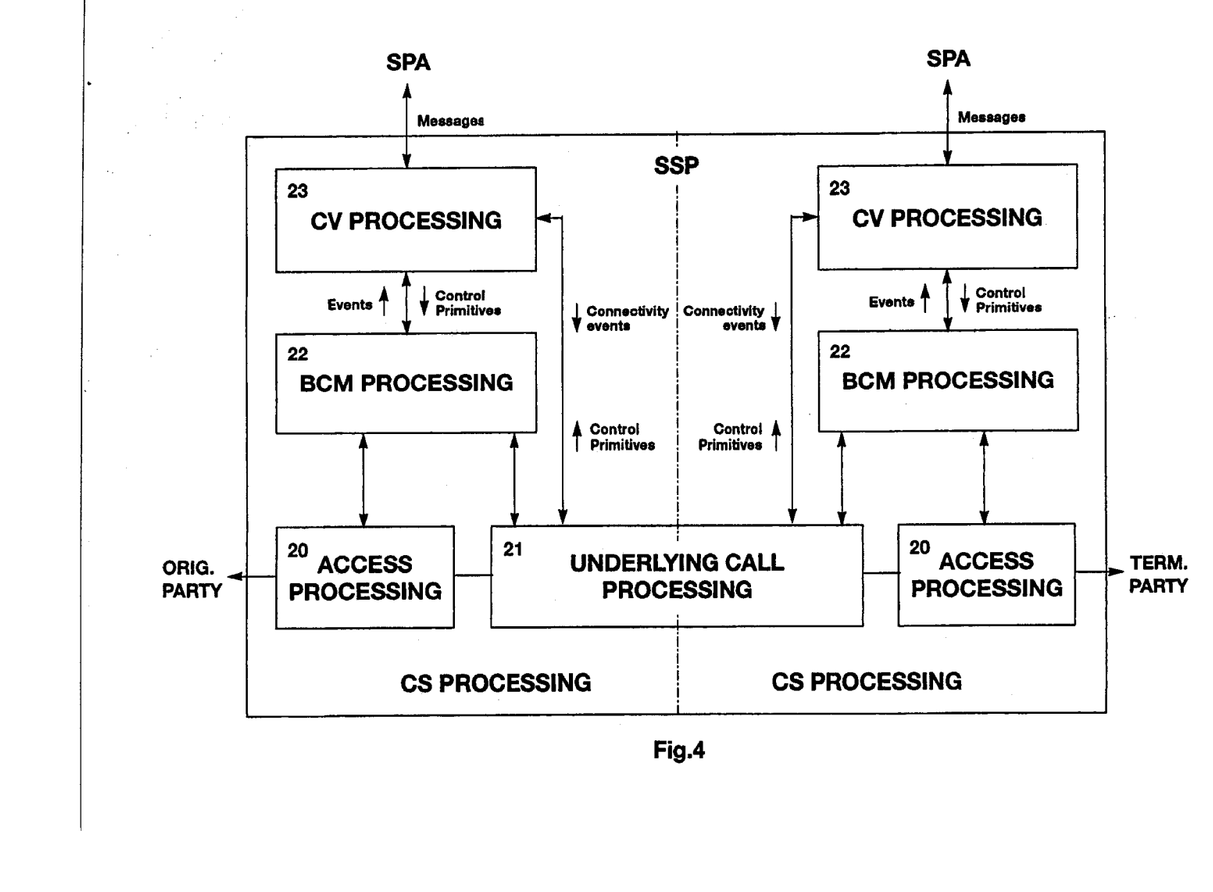
FIG. 4 is a diagram of the processing functionality of the SSP of FIG. 1.

FIG. 2 illustrates a two-party call completed through a single SSP 10 and therefore comprising only two call segments CS1, CS2. FIG. 3, however, illustrates a two-party call passing through two SSPs 10 and therefore comprising four call segments CS1 to CS4, segments CS1, CS3 being originating CSs and segments CS2, CS4 being terminating CSs.

As can be seen from FIGS. 2 and 3, a CS is itself considered to be made up of two legs L0, L1 and a connection point CP; the two legs correspond to communication paths towards respective ones of the originating and terminating parties (thus, leg L0 of CS2 in FIG. 3 represents a trunk).

In fact, a CS may comprise more than two legs in cases such as multi-party calls where there may be several legs on one side of the connection point. The association of the legs and CP of a CS represents the connectivity of the latter, that is, how it is structured to connect on.

Call Model

As a result of the foregoing segmentation of a call into originating and terminating CSs within an SSP, the call model for interfacing an SSP 10 with an SPA 12, 13 is defined in relation to a CS.

More particularly, the call model adds to the basic call processing effected for each CS, both BCM processing functionality and CV processing functionality in order to interface an SPA with the switch-based call processing of a CS. Thus, in FIG. 4, the basic switch-based call processing for a two-party call (call setup, maintenance, and clearance) within an SSP is represented by access processing blocks 20 and an underlying call processing blocks 21, whilst additional BCM processing and CV processing blocks 22 and 23 are added for each CS. The BCM processing block 22 interacts with the access processing and underlying call processing blocks 20, 21 both to report to the associated CV processing block 23 on the progress of the basic call processing operations for the CS concerned, and to enable these basic operations to be controlled by an SPA via the CV processing block. The CV processing block 23 is responsible for keeping an overview of the connectivity of the CS, for exchanging messages with an SPA as required in respect of service provision to the CS by the SPA, and for passing control primitives to the BCM processing block 22 and underlying call processing block 21 to control call processing and connectivity aspects respectively of the CS as required by the SPA for implementing a requested service.

The BCM processing block 22 carries out its function in accordance with a call model component called the Basic Call Model (BCM) that defines the points in the basic switch-based call processing where an SPA can be notified of progress and influence subsequent processing.

The CV progressing block 23 carries out its function using a call model component called the Connection View (CV) that defines what elements of a CS are visible and accessible to a SPA.

Basic Call Model (BCM)

The Basic Call Model is a representation, in state transition diagram form, that models the basic call processing in the SSP for a two-party call. Processing considered essential is represented by a series of PICs (Point in Call) that constitute the states of the BCM. Each PIC is exited on the occurrence of a pre-specified event or events. All processing features not essential to the basic processing required for two-party calls (whether switch-based or services to be requested from a SPA 12, 13) are engaged at Trigger Check Points (TCP) situated at the exit from each PIC. Whether any such further processing features are engaged at a particular TCP will depend on the trigger criteria specified at the TCP; if no trigger criteria is met at a TCP, then processing will continue at the next PIC. If a trigger criterion is met, then in the case of a SPA service being required, a message is sent to the relevant SPA together with relevant call details and the requested service is subsequently provided. The SPA can control the point in the BCM that processing continues, either allowing processing to continue at the next PIC or designating another PIC at which processing is to be resumed.

Figure 5:
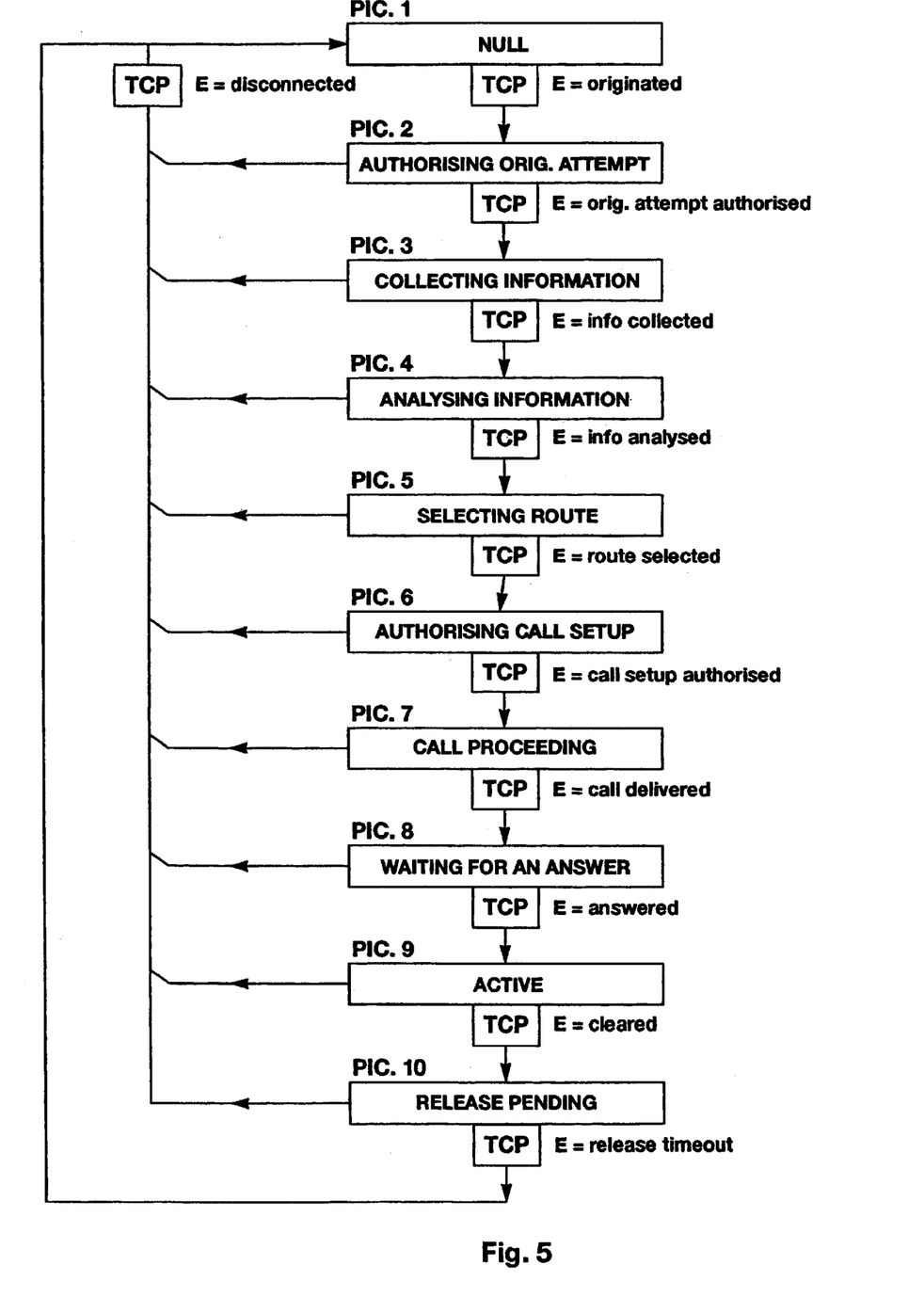
FIG. 5 is a simplified state transition diagram of an originating basic call model (BCM) modelling the basic call processing functionality of the FIG. 1 SSP for an originating call segment.
Figure 6:
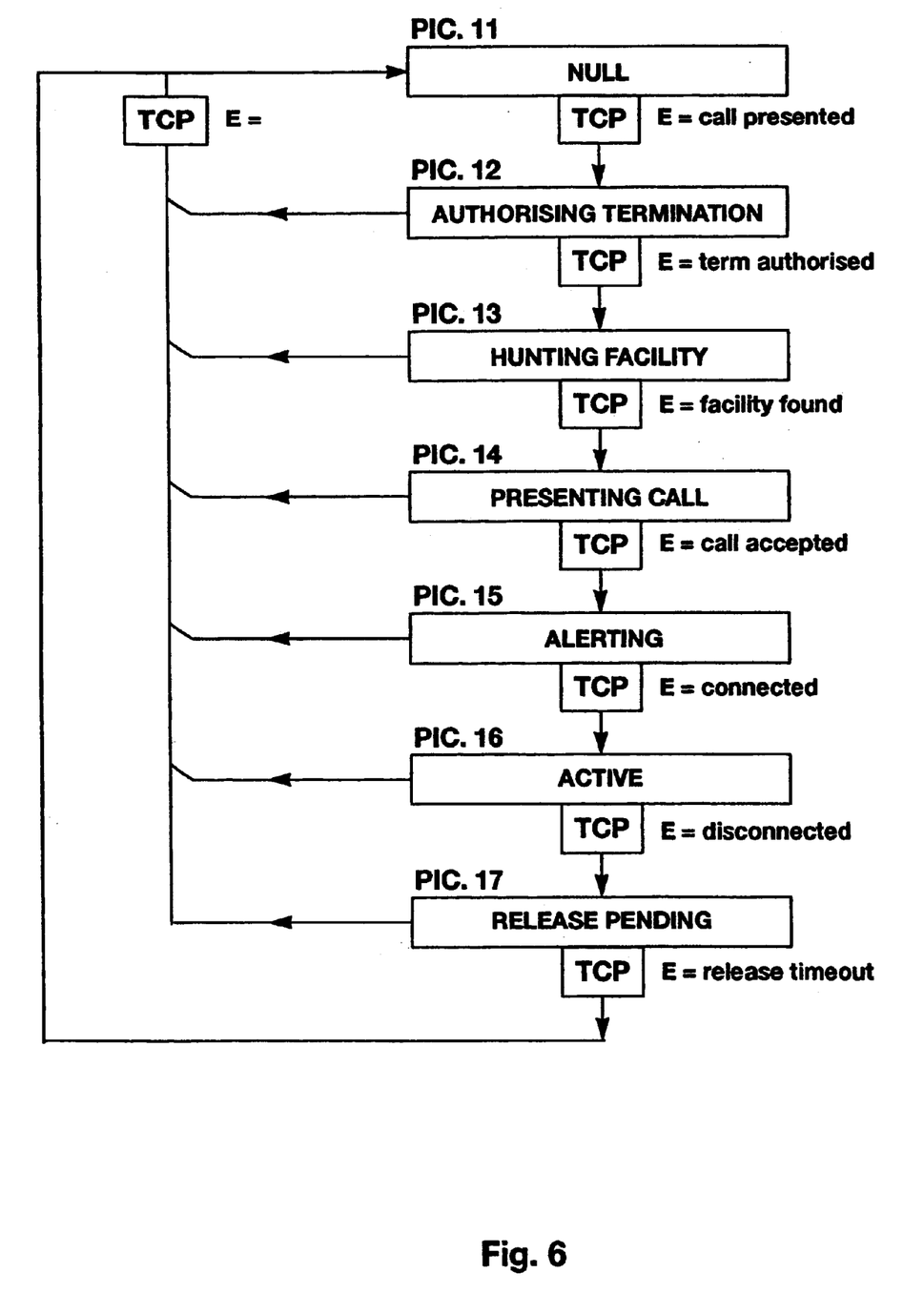
FIG. 6 is a simplified state transition diagram similar to FIG. 5 but in respect of a terminating BCM.

The BCM is divided into an originating BCM modelling the processing related to an originating CS, and a terminating BCM modelling processing related to a terminating CS. FIGS. 5 and 6 respectively show the originating and terminating BCMs but in both cases these BCM have been simplified by omission of mid-call and exception events.

The originating BCM shown in FIG. 5 comprises ten PICs 1–10 each representing the essential call processing stage named in the Figure. The event E causing exiting from each PIC is also indicated in FIG. 5. Thus, for example, PIC 6 represents the stage of call setup authorisation and the related exit event E is this authorisation being given; as with all the other PICs upon PIC 6 being exited, trigger criteria are tested in the associated TCP.

It will be seen from FIG. 6, that should a disconnection event be detected at any PIC, then the processing returns via a TCP to the null state PIC 1.

The terminating BCM shown in FIG. 6 is similar in general form to that of FIG. 5 but comprises only seven PICs 11 to 17 with their associated TCPs.

Figure 7:
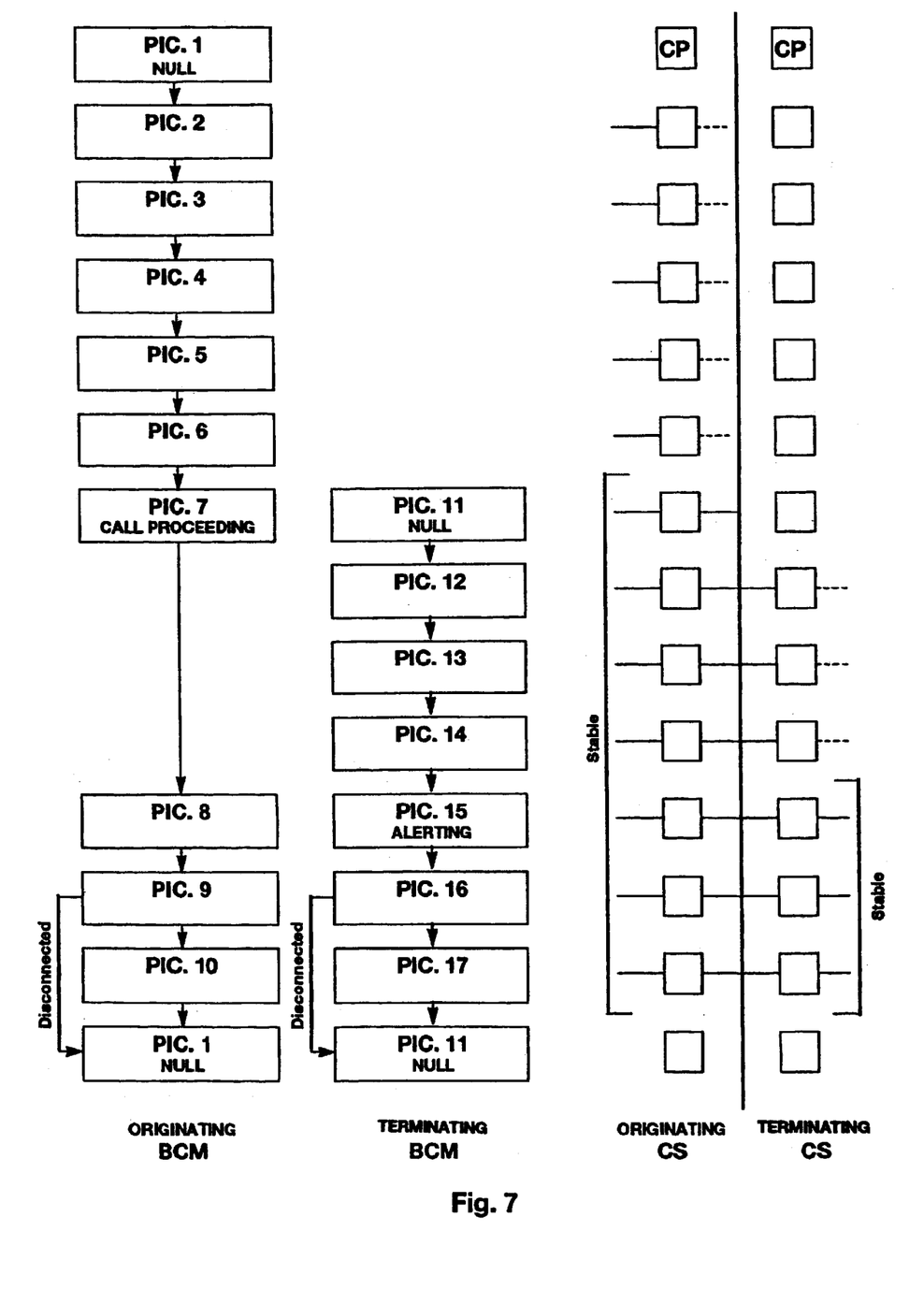
FIG. 7 is a diagram illustrating the connectivity status of originating and terminating call segments relative to progression respectively through the originating and terminating BCMs of FIGS. 5 and 6.

The state of a CS in terms of its connectivity features (CP, legs) will, of course, vary with progression through the corresponding BCM. FIG. 7 shows this variation by illustrating the status of the connectivity features of originating and terminating CSs (right-hand side of FIG. 7) relative to progression through the corresponding BCMs (shown, in simplified form, on the left-hand side of FIG. 7). During the call setup phase of a CS, the CS will lack one or both legs; once a CS has both legs it is said to be stable and remains so until the call is disconnected or cleared. Of course, for a call to be fully set up through a SSP, both the originating and terminating CSs must be in their stable states. It can be seen from FIG. 7 that the originating CS is being set up through PICs 1 to 6 and is stable through PICs 7 to 10, whilst the terminating CS is being set up through PICs 11 to 14 and is table through PICs 15 to 17. FIG. 7 also shows the relative offset between the PICs of the originating and terminating BCMs.

Figure 8:
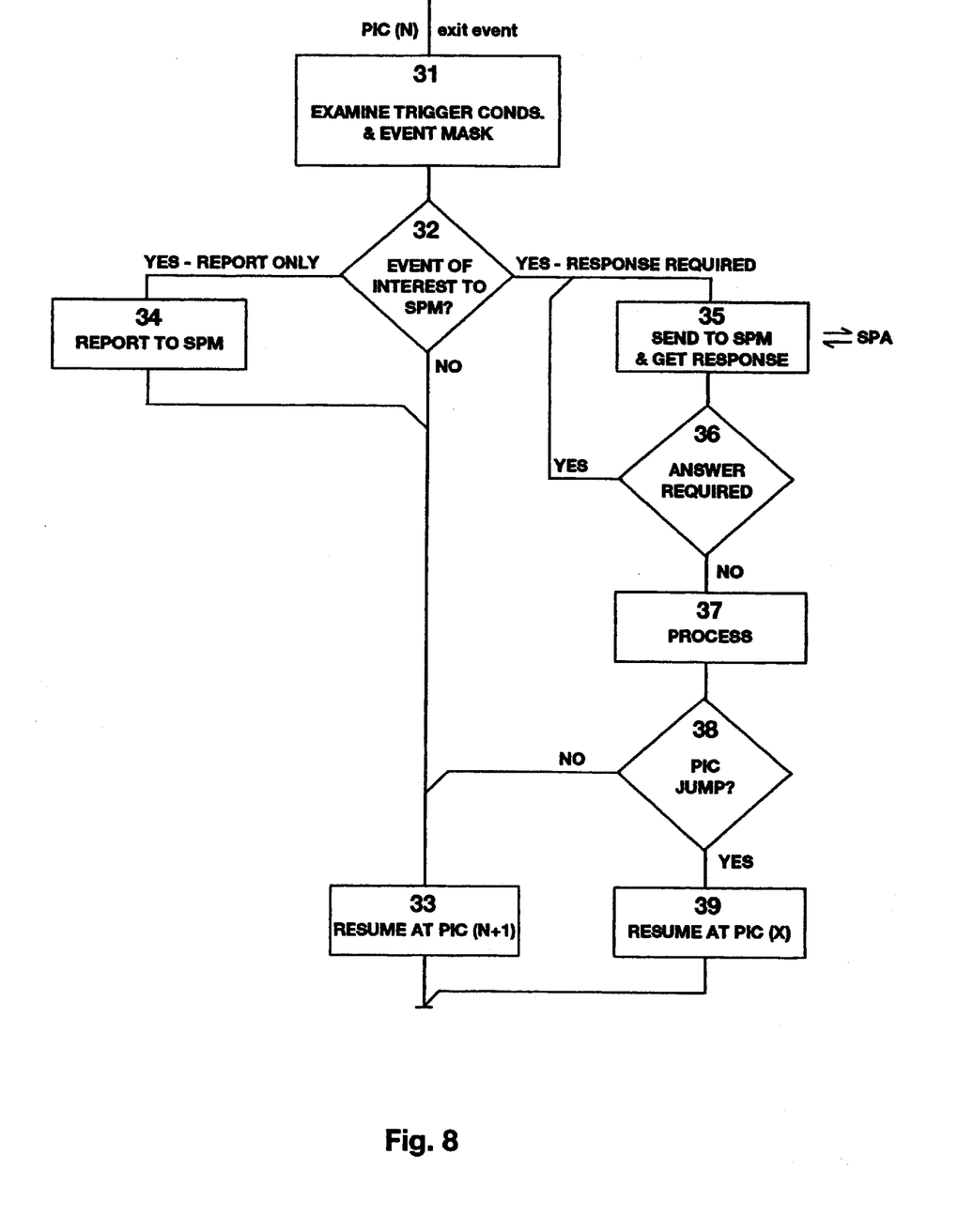
FIG. 8 is a flow chart illustrating the processing represented by trigger checkpoint (TCP) blocks shown in the FIGS. 5 and 6.

Turning next to the TCP processing flowchart of FIG. 8, further consideration will be given to what happens when a TCP is encountered in a BCM. As already noted, at a TCP, trigger criteria are checked (block 31) to see if a message should be sent to a SPA 12, 13. These trigger criteria are set in the SPP 10 by the OS 17 (see FIG. 1) together with information on the SPA to be contacted, the parameters to be sent to the SPA, and whether or not processing in the SPP in respect of the CS concerned should be suspended pending a reply from the SPA. The result of the examination in block 31 of the trigger criteria is tested in block 32 and if no trigger is met, then processing resumes at the next PIC (see block 33). If the block 32 test indicates that a trigger is satisfied but is only to be reported to be designated SPA without suspending processing, then this is done in block 34 before proceeding to the next PIC. Finally, if the block 32 test indicates that a trigger is satisfied and CS processing is to be suspended whilst a report is made to the designated SPA and a response received, then TCP processing proceeds to block 35 to report to the SPA and receive a response. In this latter case, the response from the SPA may require an answer from the SPP (see block 36) in which case block 35 is re-entered; otherwise the response is processed (block 37) and if a jump to a PIC different to the next one in sequence is requested (as tested in block 38), then this is done in block 39 on exiting TCP processing.

As part of its response at block 35, the SPA may set an event mask asking that it be notified of certain specified events as and when they occur in processing of the CS concerned. In this case, at subsequent TCPs, this event mask is examined in block 31 (together with the trigger criteria for the TCP concerned) and if a requested event has occurred, an appropriate report is made back to the SPA; as with triggers, this report can be specified to occur with or without a suspension of CS processing whereby the TCP processing blocks 32 to 39 apply equally to requested events as to triggers.

It will be appreciated that according to the call model, BCM processing does not directly effect communications with an SPA; instead, as described above, BCM processing communicates events to be reported, to CV processing and the latter communications with the SPA.

Connection View (CV)

As already noted, a CV provides, in respect of a particular CS, a representation of the basic call processing resources accessible to a SPA 12, 13. CV processing functionality (block 23, FIG. 4) manages the CV and provides the SPA with access to the resources indicated by the CV to enable the SPA to control basic call processing of the CS concerned (via BCM processing) as well as the connectivity aspects of the CS.

The CV may take the form of a collection of CV objects representing the basic call processing resources relevant to a CS by a BCM object, and the connectivity resources by CP and leg objects. The state of the resources represented by CV objects constitutes, at any one time, the CV context; as depicted in FIG. 9, the CV context 40 comprises a component (the BCM context 41) concerning the call processing (BCM) aspects of the CS concerned, and a component (the connectivity context 42) concerning the connectivity aspects of the CS.

Figure 9:
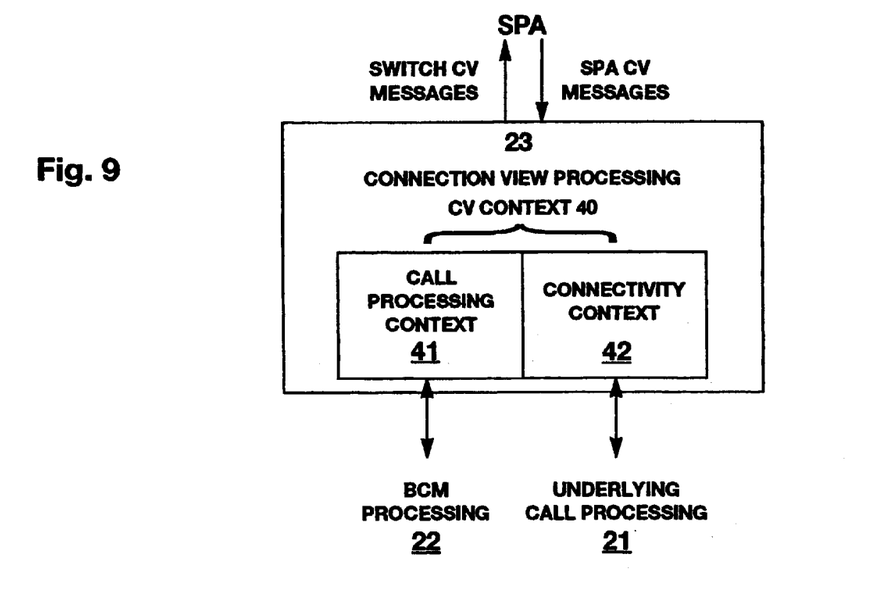
FIG. 9 is a diagram depicting the make up of a connection view (CV) and showing information flows relevant to CV processing.

FIG. 9 also shows the information flows relevant to CV processing carried out in respect of a CV. In particular, call processing events may be reported either from BCM processing 22 or underlying call processing 21 and control primitives passed to both these latter. Furthermore, "switch CV" messages may be passed to a SPA 12, 13 and "SPA CV" messages received back.

The management of CVs effected by CV processing functionality involves creating a CV in respect of a particular CS whenever an event report from the corresponding BCM indicates that a service is to be requested from an SPA 12, 13; reporting events (including triggers) to a SPA as required together with a copy of the CV context; updating the CV context to reflect changes in the state of call processing resources either due to call processing events in the SSP or due to actions that manipulate call processing resources in response to 'SPA CV' messages from a SPA; and removal of the CV when no longer of interest to the SPA.

Stable CS Reporting

As will be explained hereinafter, the SPA described below with reference to FIG. 10, requires knowledge of when a CS to which it is providing a service, has reached its stable phase during call processing. It will be apparent from the foregoing description how this may be achieved.

In particular, when a trigger is detected during processing of a BCM that indicates that a service is to be requested from an SPA, the BCM reports this to CV processing resulting in the generation of a corresponding CV and the output of a "switch CV" message to the SPA. The trigger is designated one in respect of which a response is required from the SPA. The SPA response sent back in a "SPA CV" message is arranged to include an event mask asking that it be informed of the occurrence of the event taking the CS into its stable phase (for an originating CS, this would be a 'call setup authorised' event); this event mask is passed to the BCM for the CS. Subsequently, when the event indicative of the CS entering its stable phase occurs, the relevant TCP processing will cause a report to be made to the SPA.

Service-Providing Apparatus (SPA)

Figure 10:
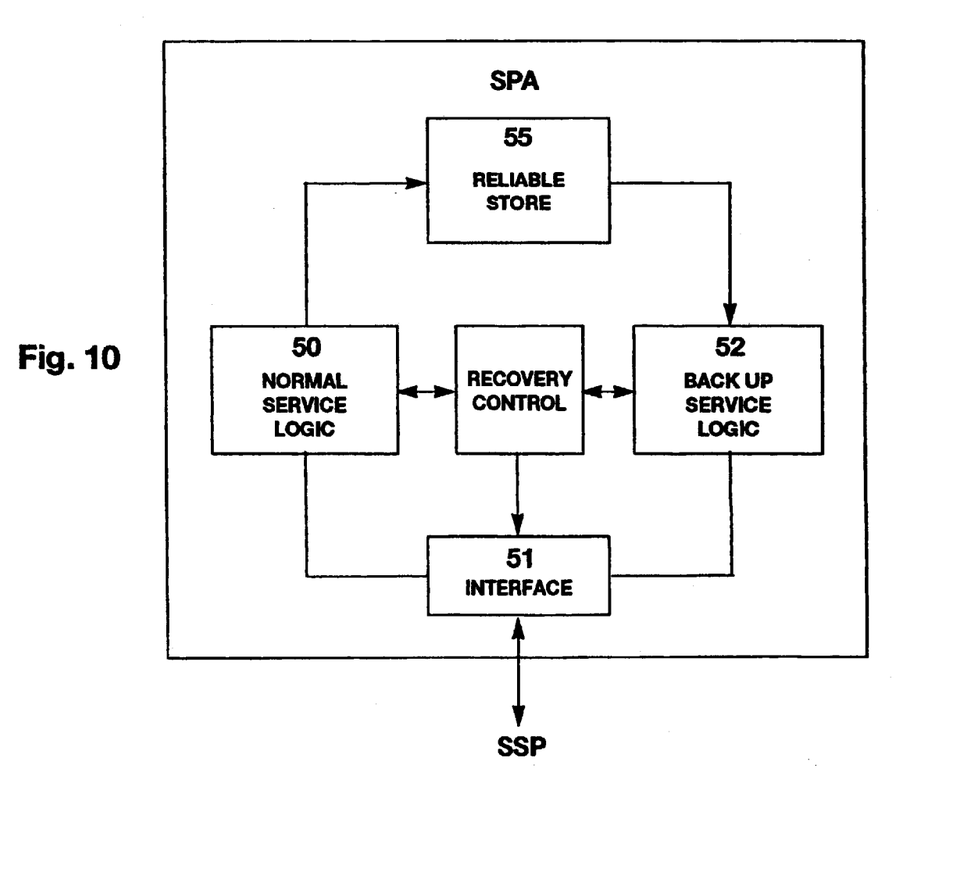
FIG. 10 is a block diagram of the service-providing apparatus embodying the invention and suitable for use as the SCP and/or Adjunct processor of FIG. 1.

FIG. 10 shows a form of SPA embodying the present invention that may be used for the SPAs 12, 13 of FIG. 1. The actual details of the hardware and software required to provide a particular service are not relevant to the present invention and will therefore not be described herein. What is of interest, is the general fault-tolerant architecture used for the SPA.

In the FIG. 10 embodiment, the SPA comprises first service logic 50 typically in the form of a general purpose processor (including local memory) running operating system software to provide SLEE functionality, and one or more SLP programs. The first service logic 50 interacts with an SSP through an interface 51 and normally provides the functionality of the SPA in respect of providing services to the SSP.

The SPA also comprises second service logic 52 that has substantially the same functionality as the first service logic 50 but is normally non-operative. The second service logic 52 serves as a backup to the first service logic 50 in case of failure of the latter. A recovery control functional unit 53 monitors the first service logic 50 and on detecting failure of the latter, brings the second service logic 52 into operation and controls the interface 51 accordingly to switch messages from the SSP to the logic 52 rather than to logic 50.

In order to enable the second service logic to continue to provide services in respect of at least some of the service requests being handled by the first service logic 50 at the time of its failure, a reliable backup store 55 is provided. The first service logic 50 is arranged to respond to a CS service request to set the event mask for the BCM of the requesting CS such that the latter will cause the first service logic 50 to be notified of when the CS enters its stable phase of call processing. Upon the first service logic 50 being notified that a CS to which it is currently providing services has entered it stable phase, the service logic 50 will save to the reliable store 55 all relevant state data for processing the CS service request; this data will include relevant CV context data and state data on the SLP processing being executed to service the service request. Of course, if a CS has already reached its stable phase before requesting a service, then the service logic 50 will save appropriate state data to the store 55 on responding to the service request.

Assuming that the first service logic 50 continues to operate normally, should the state data relevant to the CS change then the state data is saved again to the store 55 (alternatively, only the changes are saved). Upon the service logic 50 completing service provisions to a requested CV, the logic 50 will cause the state data held in the store 55 relevant to the CS, to be deleted.

Where a service request only requires a single, immediate response, then no state data will be passed to the store 55 in respect of this request.

If the first service logic 50 should fail and the second service logic 52 be brought into operation, then state data on services being provided to CSs that have reached their stable phases, is available to the second service logic to enable it to continue to provide the relevant services in a manner transparent to the user. Whilst it would be possible simply to pass all the state data held in store 55 to the backup service logic 52, this would take a significant amount of time if done all together. Accordingly, it is preferred to restore state data on each CS as and when the second service logic 52 receives messages from an SSP in respect of a current service.

The reliable store 55 is, for example, a fault-tolerant database or a disc drive. This store 55 will typically be arranged to periodically scan its contents and remove entries that have been present for longer than a predetermined period set as greater than the maximum practical time a service request will be current; in this manner, the store 55 is prevented from becoming clogged with worthless entries.

It will be appreciated that more than one backup service logic may be provided so that should the second service logic 52 also fail, another service logic can be brought into operation and so on. Where multiple backup service logics are provided, each will when the active logic, carry out the same process of saving state data on stable CS, as described above for the logic 50.

Various other modifications can, of course, be made to the FIG. 10 SPA. For example, the point in CS call processing that state data is saved can be varied from the precise BCM exit event taking the CS into its stable phase; the important point is that since most of the service-provision actions occur during call setup, then provided the saving of state data relevant to service provisions to a CS is not initiated until after the majority of service-provision actions required during CS setup have been completed, there will be considerably fewer save operations required than if all service-provision actions initiated a save to store 55.

Furthermore, in the case of many of the services to be provided by the SPA, the service-providing SLP will be called upon at or near the point where the CS enters its stable phase. In such cases, the SLP can itself be used to initiate a save of state data to store 55 without there being any need for an explicit event report to be made from the SSP; there is thus no need for the corresponding BCM event mask to be set to request event reporting for identifying entry into the stable phase of CS call processing. Indeed, an approach may be adopted in which no service will specifically request the reporting of an event in order to initiate saving of state data; instead, the saving of state data will be first effected for a particular service whenever it is determined that the next subsequent action to be taken on the service may not occur until after the CS concerned has entered its stable phase. This may mean that state data will be saved early on in the set up phase of a CS if the next service-provision action is one that will not occur until after the CS has entered its stable phase.

It will be seen that regardless of whether the first saving of state data is prompted explicitly by the SSP or is determined by the SPA in accordance of where it is in the process of service provision, the effect is to defer the saving of state data until after all or most of the service-provision actions required during CS setup have been completed.

I claim:

1. Service providing apparatus for providing telephonic voice and data call processing services to a switching center of a telecommunications network, said switching center being operative to establish temporary telephonic voice and/or data call connections between separate end users, said services being provided for telephonic voice and/or data call segments which the switching center sets up, maintains, and clears, said service-providing apparatus comprising:

first service logic apparatus for normally providing said services to the switching center, at least in respect of set up of call segments, in response to requests for such services, at least some of said services involving multiple service-provision actions by the first service logic apparatus;

second service logic apparatus for providing said services to the switching center in case of failure of the first service logic apparatus;

recovery apparatus responsive to failure of the first service logic apparatus to bring into operation said second service logic apparatus; and a backup store;

the first service logic apparatus, when providing a service involving multiple service-provision actions for a particular call segment, being operative only after completing at least some of said service-provision actions, if any, that are required during set up of said particular call segment, to save to said backup store state data concerning service provision to said particular call segment, and said second service logic apparatus, on being brought into operation, retrieving from said backup store, at least when needed, said state data stored therein by the first service logic apparatus, said state data being needed by said second service logic apparatus to complete the provision to said particular call segment of the service which the first service logic apparatus was providing when the first service logic apparatus failed.

2. The service providing apparatus of claim 1 wherein the first service logic apparatus, when providing a service involving multiple service-provision actions for a particular call segment, is operative only after completing at least a majority of said service-provision actions, if any, that are required during set up of said particular call segment, to save to said backup store state data concerning service provision to said particular call segment.

3. Service providing apparatus according to claim 2, wherein the first service logic apparatus determines that it has substantially completed at least the majority of its service-provision actions required during the set up of the corresponding call segment when notified by the switching centre that at least the majority of the call-segment set-up process has been completed.

4. Service providing apparatus according to claim 2, wherein the first service logic apparatus determines that it has substantially completed at least the majority of its service-provision actions required during the set up of the corresponding call segments, when the progress of service provision by the service logic apparatus to a particular call segment so indicates.

5. Service providing apparatus according to claim 2, wherein the first service logic apparatus determines that it has substantially completed at least the majority of its service provision actions required during the set up of the corresponding call segments, when it determines that the next service-provision action may not be required until the corresponding call segment has entered its stable phase.

6. Service-providing apparatus according to claim 2, wherein following the first saving of state data to said back-up store by the first service logic apparatus in respect of a particular call segment, any changes in this state data in the first service logic apparatus gives rise to an updating of the state data held in the backup store.

7. Service-providing apparatus according to claim 2, wherein said backup store is a fault-tolerant database.

8. Service-providing apparatus according to claim 2, wherein state data concerning a particular call segment is only passed to said second service logic apparatus when the latter requires such information as a result of a communication from said switching centre.

9. Service-providing apparatus according to claim 2, wherein sessions of one or more calls can be established with session information on such sessions being held in said service providing apparatus and saved to said backup store, said session information being passed from the backup store to the second service logic apparatus, on bringing into operation of the latter, only where state data for a current call segment relevant to the corresponding session is also passed to the second service logic apparatus.

10. Service providing apparatus for providing telephonic voice and data call processing services to a switching center of a telecommunications network, said switching center being operative to establish temporary telephonic voice and/or data call connections between separate end users, said services being provided for telephonic voice and/or data call segments which the switching center sets up, maintains, and clears, said service-providing apparatus comprising:
    first service logic apparatus for normally providing said services to the switching center, at least in respect of set up of call segments, in response to requests for such services, at least some of said services involving multiple service-provision actions by the first service logic apparatus;
    second service logic apparatus for providing said services to the switching center in case of failure of the first service logic apparatus;
    recovery apparatus responsive to failure of the first service logic apparatus to bring into operation said second service logic apparatus; and
    a backup store;
the first service logic apparatus, when providing a service involving multiple service-provision actions for a particular call segment, being operative only after at least some of service-provision actions, if any, that are required during set-up of said particular call segment have been completed, to save to said backup store state data held by the first service logic apparatus on service provision to said particular call segment, and said second service logic apparatus, on being brought into operation, retrieving from said backup store, at least when needed, said state data stored therein by the first service logic apparatus, said state data being needed by said second service logic apparatus to complete the provision to said particular call segment of the service which the first service logic apparatus was providing when the first service logic apparatus failed.

11. The service providing apparatus of claim 10 wherein the first service logic apparatus, when providing a service involving multiple service-provision actions for a particular call segment, being operative only after at least a majority of service-provision actions, if any, that are required during set-up of said particular call segment have been completed, to save to said backup store state data held by the first service logic apparatus on service provision to said particular call segment.

12. A telecommunications network operative to establish temporary telephonic voice and/or data call connections between separate end users, said telecommunications network comprising:
    a switching system for effecting basic telephonic voice and data call processing to set up, maintain and clear telephonic voice and/or data calls, the switching system treating each telephonic voice and/or data call as including at least one call portion and the switching system being operative to set-up, maintain and clear each such call portion;
    telephonic voice and data service providing apparatus communicating with the switching system for providing telephonic voice and data services additional to said basic call processing;
    interface apparatus for interfacing the switching system with the service providing apparatus whereby to enable the switching system to
        (a) request service provision for a particular call portion from the service providing apparatus, to
        (b) report, to the service providing apparatus, progress through a process of set-up, maintenance and clearance of said particular call portion, and to
        (c) enable the service providing apparatus to influence said process according to the service being provided by the service providing apparatus;
    wherein:
        said interface apparatus is operative to report to the service providing apparatus when set-up of said particular call portion is at least partially complete; and
        the service providing apparatus includes
            first service logic apparatus for normally providing said services to the switching system,
            second service logic apparatus for providing said services to the switching system in case of failure of the first service logic apparatus,
            recovery apparatus responsive to failure of the first service logic apparatus to bring into operation said second service logic apparatus, and a backup store;
        the first service logic apparatus, when providing a service involving multiple service-provision actions for said particular call segment, being operative to save to said backup store call-portion related data held by the first service logic apparatus concerning each call portion for which it is currently providing services, the saving of data about said particular call portion being effected only after said interface apparatus has reported that set-up of said particular call portion has been at least partially completed, and said second service logic apparatus, on being brought into operation, being provided from said backup store with the call-portion related data which is necessary to enable said second service logic apparatus to complete the provision of which the first service logic apparatus was providing when the first service logic apparatus failed.

13. The telecommunications network of claim 12 wherein said interface apparatus is operative to report to the service providing apparatus when set-up of said particular call portion is at least substantially complete; and wherein the saving of data about said particular call portion is effected only after said interface apparatus has reported that set-up of said particular call portion has been at least substantially completed.

14. A method for providing telephonic voice and/or data call processing services to a switching center of a telecommunications network, said switching center being operative to establish temporary telephonic voice and/or data call connections between separate end users, said services being provided for telephonic voice and/or data call segments which the switching center sets up, maintains, and clears, said method comprising:

normally providing said services to the switching center by first service logic apparatus, at least in respect of set up of call segments, in response to requests for such services, at least some of said services involving multiple service-provision actions by the service logic apparatus;

saving to a backup store by the first service logic apparatus, when providing a service involving multiple service-provision actions for a particular call segment, state data held by the first service logic apparatus concerning service provision to said particular call segment, the saving of state data being effected for said particular call segment only after the first service logic apparatus has determined that it has substantially completed at least some of said service-provision actions, if any, that are required during set up of said particular call segment; and upon failure of said first service logic apparatus, bringing into operation by recovery apparatus responsive to said failure a second service logic apparatus for rendering said services to the switching center, said second service logic apparatus, on being brought into operation, retrieving from said backup store state data which is necessary to enable said second service logic apparatus to complete the provision to said particular call segment of services which the first service logic apparatus was providing when the first service logic apparatus failed.

15. The method of claim 14 wherein the step of saving state data is effected for said particular call segment only after the first service logic apparatus has determined that it has substantially completed at least a majority of said service-provision actions, if any, that are required during set up of said particular call segment.

16. The method according to claim 15, wherein the first service logic apparatus determines that it has substantially completed at least the majority of its service-provision actions required during the set up of the corresponding call segment when notified by the switching center that at least the majority of the call-segment set-up process has been completed.

17. The method according to claim 15, wherein the first service logic apparatus determines that it has substantially completed at least the majority of its service-provision actions required during the set up of the corresponding call segments, when the progress of service provision by the service logic apparatus to a particular call segment so indicates.

18. The method according to claim 15, wherein the first service logic apparatus determines that it has substantially completed at least the majority of its service provision actions required during the set up of the corresponding call segments, when it determines that the next service-provision action may not be required until the corresponding call segment has entered its stable phase.

19. The method according to claim 15, wherein following the first saving of state data to said back-up store by the first service logic apparatus in respect of a particular call segment, any changes in this state data in the first service logic apparatus gives rise to an updating of the state data held in the backup store.

20. The method according to claim 15, wherein said backup store is a fault-tolerant database.

21. The method according to claim 15, wherein state data concerning a particular call segment is only passed to said second service logic apparatus when the latter requires such information as a result of a communication from said switching center.

22. The method according to claim 15, wherein sessions of one or more calls can be established with session information on said sessions being held in said service providing apparatus and saved to said backup store, said session information being passed from the backup store to the second service logic apparatus, on bringing into operation of the second service logic apparatus, only when state data for a current call segment relevant to the corresponding session is also passed to the second service logic apparatus.

23. A method for providing telephonic voice and/or data call processing services to a switching center of a telecommunications network, said switching center being operative to establish temporary telephonic voice and/or data call connections between separate end users, said services being provided for telephonic voice and/or data call segments which the switching center sets up, maintains, and clears, said method comprising:

normally providing said services to the switching center by first service logic apparatus, at least in respect of set up of call segments, in response to requests for such services, at least some of said services involving multiple service-provision actions by the first service logic apparatus;

saving to a backup store by the first service logic apparatus, when providing a service involving multiple service-provision actions for a particular call segment, state data held by the first service logic apparatus concerning service provision to said particular call segment, the saving of state data being effected for said particular call segment only after at least some of set-up process for the segment have been completed; and upon failure of said first service logic apparatus, bringing into operation by recovery apparatus responsive to said failure a second service logic apparatus for rendering said services to the switching center, said second service logic apparatus, on being brought into operation, retrieving from said backup store, state data which is necessary to enable said second service logic apparatus to complete the provision to said particular call segment of services which the first service logic apparatus was providing when the first service logic apparatus failed.

24. The method of claim 23 wherein the step of saving to a backup store by the first service logic apparatus is effected for said particular call segment only after at least the majority of set-up process for the segment has been completed.

25. A method of operating a telecommunications network operative to establish temporary telephonic voice and/or data call connections between separate end users, said telecommunications network including a switching system for effecting basic telephonic voice and/or data call processing to set up, maintain and clear calls, the switching system treating each call as including at least one call portion and the switching system being operative to set-up, maintain and clear each such call portion;

telephonic voice and/or data service providing apparatus communicating with the switching system for providing telephonic voice and/or data services additional to said basic call processing;

interface apparatus for interfacing the switching system with the service providing apparatus to enable the switching system to
  (a) request service provision from the service providing apparatus for a particular call portion, to
  (b) report, to the service providing apparatus, progress through a process of set-up, maintenance and clearance of said particular call portion, and to
  (c) enable the service providing apparatus to influence said process according to the service being provided by the service providing apparatus, the method comprising:

operating said interface apparatus to report to the service providing apparatus when set-up of said particular call portion is at least substantially complete;

providing first service logic apparatus for normally providing said services to the switching system, at least in respect of set-up of call segments, in response to requests for such services, at least some of said services involving multiple service-provision actions by the service logic apparatus, said first service logic apparatus being operative, only after said interface apparatus has reported that set-up of said particular call portion has been at least partially completed, to save to a backup store call-portion related data held by the first service logic apparatus concerning said particular call portion; and providing recovery apparatus, responsive to failure of said first service logic apparatus, to bring into operation a second service logic apparatus for providing said services to the switching system in case of failure of said first service logic apparatus, said second service logic apparatus, on being brought into operation, being provided from said backup store with said call-portion related data which is necessary to enable said second service logic apparatus to complete the provision of services on said particular call portion which the first service logic apparatus was providing when the first service logic apparatus failed.

26. The method of claim 25 wherein said first service logic apparatus is operative, only after said interface apparatus has reported that set-up of said particular call portion has been at least substantially completed, to save to a backup store call-portion related data held by the first service logic apparatus concerning said particular call portion.

* * * * *